(12) United States Patent
Chen et al.

(10) Patent No.: US 9,117,179 B2
(45) Date of Patent: Aug. 25, 2015

(54) PREDICTING USER ACTIVITY IN SOCIAL MEDIA APPLICATIONS

(71) Applicant: International Business Machines Corporation, Armonk, NY (US)

(72) Inventors: Jilin Chen, Mountain View, CA (US); Jalal U. Mahmud, San Jose, CA (US); Jeffrey W. Nichols, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/792,474

(22) Filed: Mar. 11, 2013

(65) Prior Publication Data

US 2014/0258188 A1 Sep. 11, 2014

(51) Int. Cl.
G06Q 10/00 (2012.01)
G06N 99/00 (2010.01)
G06N 5/04 (2006.01)

(52) U.S. Cl.
CPC .............. *G06N 99/005* (2013.01); *G06Q 10/00* (2013.01); *G06N 5/04* (2013.01)

(58) Field of Classification Search
None
See application file for complete search history.

(56) References Cited

U.S. PATENT DOCUMENTS

| | | |
|---|---|---|
| 6,742,032 B1 | 5/2004 | Castellani et al. |
| 2007/0282887 A1 | 12/2007 | Fischer et al. |
| 2011/0276396 A1* | 11/2011 | Rathod ..................... 705/14.49 |
| 2011/0289037 A1 | 11/2011 | Tullio et al. |
| 2012/0023226 A1* | 1/2012 | Petersen et al. .............. 709/224 |
| 2012/0221411 A1 | 8/2012 | Graham, Jr. |

FOREIGN PATENT DOCUMENTS

WO 2010022147 A1 2/2010

OTHER PUBLICATIONS

Avrahami et al., "Responsiveness in Instant Messaging: Predictive Models Supporting Inter-Personal Communication", CHI 2006 Proceedings • Using Knowledge to Predict & Manage, Apr. 22-27, 2006 • Montréal, Québec, Canada [online], [retrieved on Dec. 20, 2012]. Retrieved from the Internet <URL: http://www.cs.cmu.edu/~nx6/pubs/Avrahami_CHI_06.pdf>.

Begole et al., "Work Rhythms: Analyzing Visualizations of Awareness Histories of Distributed Groups", Proceedings of the ACM Conference on Computer Supported Cooperative Work CSCW'02, Nov. 16-20, 2002, New Orleans, Louisiana [online], [retrieved on Dec. 20, 2012]. Retrieved from the Internet <URL: http://citeseerx.ist.psu.edu/viewdoc/download?doi=10.1.1.66.4071&rep=rep1&type=pdf>.

(Continued)

*Primary Examiner* — Kakali Chaki
*Assistant Examiner* — Mai T Tran
(74) *Attorney, Agent, or Firm* — Maeve McCarthy

(57) ABSTRACT

Embodiments of the invention relate to predicting user activity in a social media application. In one embodiment, user activity information is collected for a user from a social media application and activity features of the user are determined, based on the collected activity information for the user. Then a model is created to predict a future activity of the user in the social media application. The model uses the determined activity features of the user and results obtained from running the created model, to determine future activity of the user in the social media application.

17 Claims, 3 Drawing Sheets

(56) References Cited

OTHER PUBLICATIONS

IBM Corporation, "Using IBM Social Business to Take Your Business Relationships to the Next Level: A Game Changer for Small, Medium, and Large Businesses", IBM Redbooks, REDP-4746-00, Created or Updated on Apr. 5, 2011, Copyright IBM Corp. 2011.

"Refining a set of Keywords Utilizing Historical Activity Thresholds", Jun. 25, 2012, IP.com [online], [retrieved on Nov. 19, 2012]. Retrieved from: Prior Art Database, IP.com No. IPCOM000219173D.

"Interfacing Assets of an Entity With a Social Media Service", Jun. 25, 2012, IP.com [online], [retrieved on Nov. 19, 2012]. Retrieved from: Prior Art Database, IP.com No. IPCOM000219174D.

Lai et al., "Question Routing by Modeling User Expertise and Activity in cQA services", The 26th Annual Conference of the Japanese Society for Artificial Intelligence, 2012, 3M1-IOS-3a-2 [online], [retrieved on Dec. 19, 2012]. Retrieved from the Internet <URL: http://kaigi.org/jsai/webprogram/2012/pdf/715.pdf>.

Mitchell et al., "Extracting Knowledge about Users' Activities from Raw Workstation Contents", American Association for Artificial Intelligence, Copyright 2006 [online], [retrieved on Dec. 20, 2012]. Retrieved from the Internet <URL: http://citeseerx.ist.psu.edu/viewdoc/download?doi=10.1.1.64.9180&rep=rep1&type=pdf>.

Shen et al., "A Hybrid Learning System for Recognizing User Tasks from Desktop Activities and Email Messages", Proceeding of IUI'06, Jan. 26-Feb. 1, 2006, Sydney, Australia [online], [retrieved on Dec. 20, 2012]. Retrieved from the Internet <URL: http://citeseerx.ist.psu.edu/viewdoc/download?doi=10.1.1.136.4795&rep=rep1&type=pdf>.

Shi et al., "Keeping Up with Friends' Updates on Facebook", Proceedings of the 18th international conference on Collaboration and Technology CRIWG'12 [online], [retrieved on Dec. 19, 2012]. Retrieved from the Internet <URL: http://www.berbiqui.org/thomas/Criwg2012-2.pdf>.

Stumpf et al, "The TaskTracer System", Proceedings of the 20th national conference on Artificial intelligence AAAI'05 [online], [retrieved on Dec. 20, 2012]. Retrieved from the Internet <URL: http://www.aaai.org/Papers/AAAI/2005/ISD05-022.pdf>.

\* cited by examiner

PREDICTING USER ACTIVITY IN SOCIAL MEDIA APPLICATIONS

This invention was made with Government support under W911NF-12-C-0028 awarded by Army Research Office. The Government has certain rights in this invention.

BACKGROUND

The present invention relates generally to the field of social media applications, and more particularly to predicting user activity in social media applications.

Social media applications are the means by which organizations, communities and individuals interact by creating, sharing, discussing, exchanging and commenting on content in virtual communities and networks. Different types of social media include collaborative projects, social networking sites, content communities, or virtual worlds.

Social media differentiates from traditional media in aspects such as reach, frequency, and immediacy. As a result, social media is one of the most powerful sources for news updates, and has created many new opportunities for business, such as marketing research and sales promotion. Internet users often spend more time in social media than any other site, and typically log in from multiple computing devices, such as a mobile device or a desktop computer, at the same time. This allows for the incorporation of new factors, such as the current location of the user, when disseminating news updates, or marketing or sales information.

BRIEF SUMMARY

Embodiments of the present invention disclose a method, computer program product, and computer system for predicting user activity in a social media application. In one embodiment, activity information is collected for a user from a social media application and activity features of the user are determined, based on the collected activity information for the user. Then a model is created to predict a future activity of the user in the social media application. The model uses the determined activity features of the user and results obtained from running the created model to determine the future activity of the user in the social media application.

DETAILED DESCRIPTION

Figure 1:
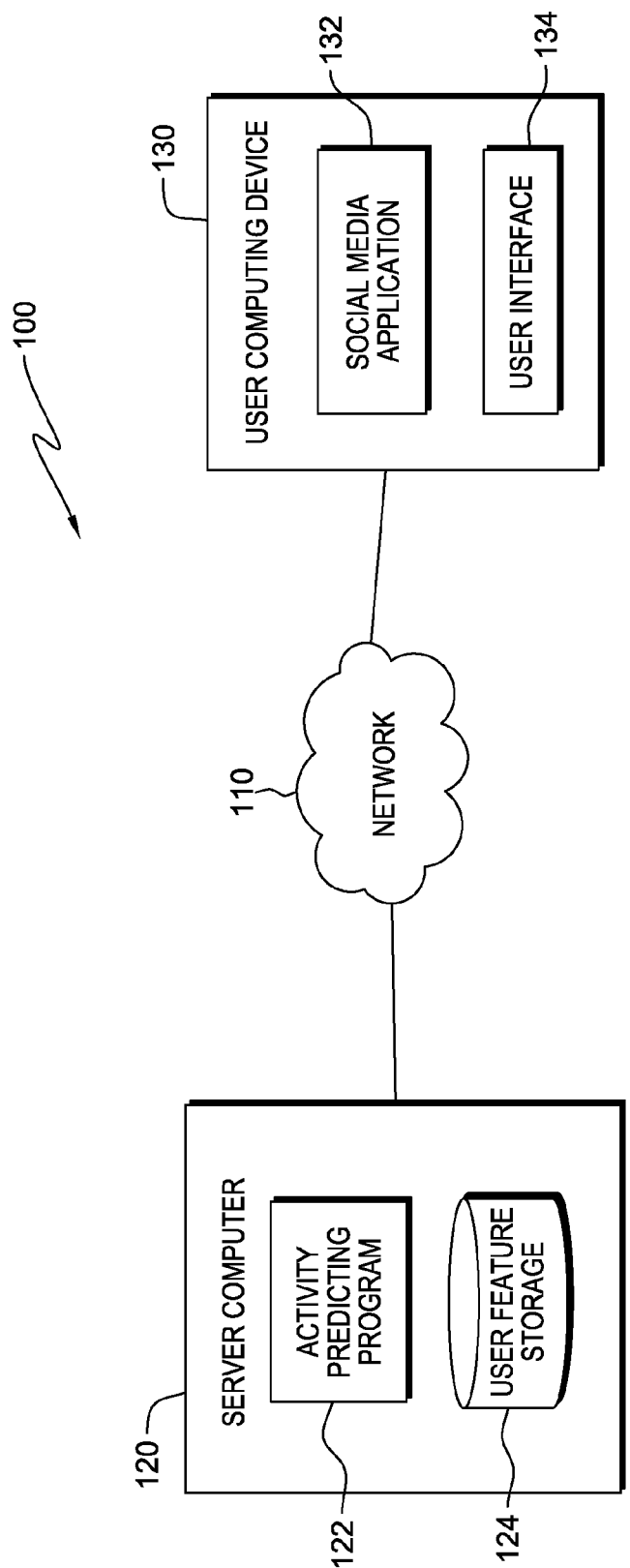
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server computer 120 and user computing device 130, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server computer 120 and user computing device 130.

Server computer 120 includes activity predicting program 122 and user feature storage 124. Server computer 120 can be a laptop computer, tablet computer, netbook computer, personal computer (PC), a desktop computer, a personal digital assistant (PDA), a smart phone, or any programmable electronic device capable of communicating with user computing device 130 via network 110 and with various components and devices within distributed data processing environment 100. Server computer 120 may include internal and external hardware components, as depicted and described in further detail with respect to FIG. 3.

Activity predicting program 122 collects a variety of social media information related to a user, including, for example, the user's historical and recent activities and the historical and recent activities of the user's friends, family, and followers. The collected information is used to determine features of a user's social media interaction. The features can include the user's historical and recent type of action, frequency of action, and content of each action. Activity predicting program 122 also determines, or calculates, the historical and recent features of the social media population connected to the user, for example, members of the social media population the user is exposed to or the type and content of each action taken by the user's friends. Activity predicting program 122 creates models that are used to predict the user's next action, or time of next action.

User feature storage 124 stores historical information and calculated historical features for each user. Activity predicting program 122 uses the stored information, in addition to collecting recent information for each user, to develop predictions for a user's social media application activity. While in FIG. 1, user feature storage 124 is included in server computer 120, one of skill in the art will appreciate that in other embodiments, user feature storage 124 may be located elsewhere within distributed data processing environment 100 and can communicate with activity predicting program 122 via network 110.

User computing device 130 includes social media application 132 and user interface (UI) 134. In various embodiments of the present invention, user computing device 130 can be a laptop computer, tablet computer, netbook computer, PC, a desktop computer, a PDA, a smart phone, or any programmable electronic device capable of communicating with server computer 120 via network 110. User computing device 130 may include internal and external hardware components, as depicted and described in further detail with respect to FIG. 3. Social media application 132 can be a community, a blog, a social networking site, a virtual world, or any virtual community or network which allows users to create, exchange, discuss and share content and ideas. Examples of social media applications are Twitter®, LinkedIn®, YouTube™, or Facebook®. Social media application 132 can be displayed to a user of user computing device 130 on UI 134. UI 134 may be, for example, a graphical user interface (GUI) or a web user interface (WUI) and can display text, documents, web browser windows, user options, application interfaces and instructions for operation.

Figure 2:
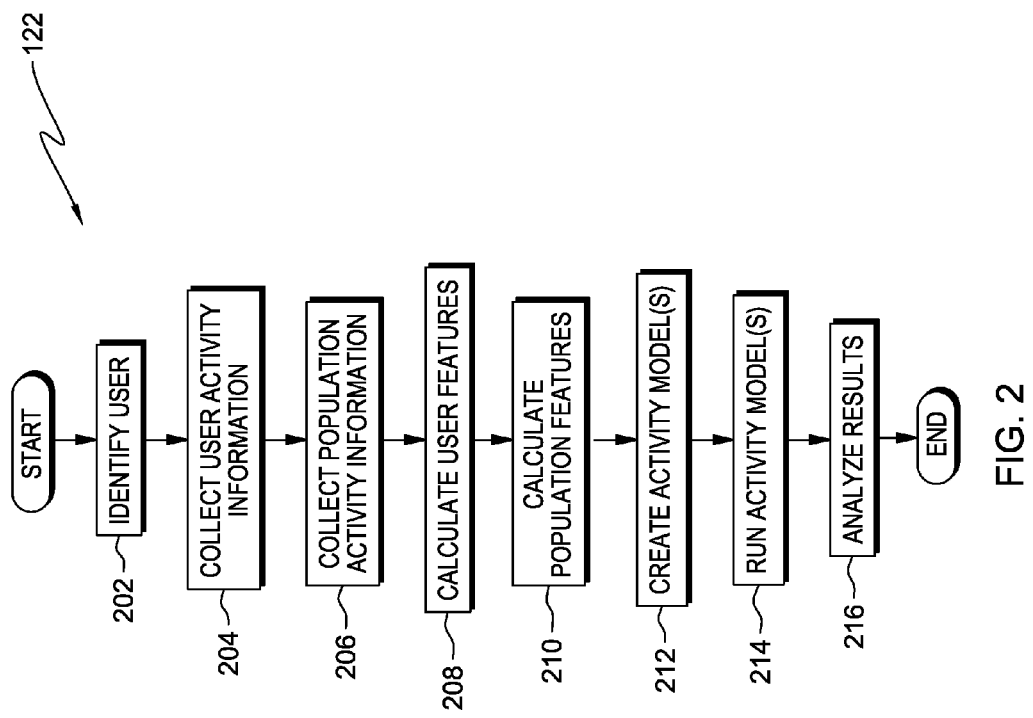
FIG. 2 is a flowchart depicting operational steps of an activity predicting program, for collecting historic and recent user activity information and creating models to predict future user activity and actions, in accordance with an embodiment of the present invention.

FIG. 2 is a flowchart depicting operational steps of activity predicting program 122, for collecting historic and recent user activity information and creating models to predict future user activity and actions, in accordance with an embodiment of the present invention.

Activity predicting program 122 identifies a user (step 202). A user may be identified, for example, from a predetermined list of users, from a list of followers of a product website, or based on a keyword search, such as a search for users that may have posted on a specific news update or product.

Activity predicting program 122 collects user activity information (step 204). User activity information may include long term activity patterns and produced content (historical information) or activities and produced content of the user immediately before the current time (recent information). Historical information can be collected and stored in user feature database 124 for use by activity predicting program 122, while recent information can be collected at the current time, for example, from social media application 132 via network 110. User activity information may include the frequency and type of action, for example, a re-post of a news item or a post about a restaurant or product, the time of day and day of week of the action, the interval between each action, or keyword and topics of produced content.

Activity predicting program 122 collects population activity information (step 206). Population activity information may also include long term activity (historical information), retrieved from user feature storage 124, and activity immediately before the current time (recent information), collected from social media application 132. Population activity information, however, is the activity and produced content of users connected to the user, for example, friends, family, and followers, users in the same geographic region, or even users that speak the same language. Collected activity information can include actions and produced content that the user is exposed to, for example, posts from users in the same geographic region regarding a news item, or posts from friends regarding a new restaurant, either long term or immediately before the current time.

Activity predicting program 122 calculates user features (step 208). User features, both historical and recent features, can include the type of action, the frequency of each action, the temporal distribution of each action type (over a day or a week), and the content associated with each type of action.

Activity predicting program 122 calculates population features (step 210). Historical population features are calculated across historical activities of a population, and can include the frequency, temporal distribution and content of the user's friends or followers, users in the same geographic region, users of the same language, or all users. Recent population features can be calculated based on the content the user would be exposed to if recently active, and can be limited to the type and content of recent actions by friends and followers.

Activity predicting program 122 creates activity model(s) (step 212). Activity predicting program 122 creates a model to estimate activity level and/or a time before next action. Activity level represents how active a user currently is, and leads to an assumption that an active user is more likely to respond and to respond quickly to a request for action. A time before next action is particular to different types of action, for example, posting a message or clicking a link in a message. A time before next action may not rely on the activity level of the user.

A model can take the form of a mathematical model, a machine learning model or an ensemble of several models. The model may be set up in various ways, for example, it can use the same settings and parameters for a collection of users, or use different settings and parameters for each individual user. The settings and parameters can take into account all features, or only historical user and population features, for example. In an exemplary embodiment, a generative mathematical model, known as a Markov Modulated Poisson process, is used. In the process, each user has a hidden state, which can be either active or inactive. The user can take various actions in social media application 132 over time, and after each action, the user may change from inactive to active, or vice versa. The time between consecutive actions follows different exponential distributions depending on whether the user is active or not. In general, active users tend to take actions sooner, while inactive users tend to take actions later.

In the exemplary embodiment, given the model, the parameters within the model can be inferred by the proposed features, using Expectation Maximization (EM) algorithms. Historical features, e.g., the historical frequency that the user takes actions, determine the prior probability of the hidden state. Recent features, e.g., the recent time sequence of intervals between actions, serve as the ground truth of the EM algorithm. After the parameters are inferred, the time before next action, or the possibility that the user will take action in the immediate future, can be drawn from the exponential distribution of the model.

Activity predicting program 122 runs the activity models(s) (step 214) and analyzes the results (step 216). Activity predicting program 122 may create, and then run, one model or several models. In various embodiments, if several models are created, the results may be compared with historical data and posts in social media applications. The results are analyzed to determine which model to use, or which combination of models to use to best estimate a user's activity level, or time before next action.

Figure 3:
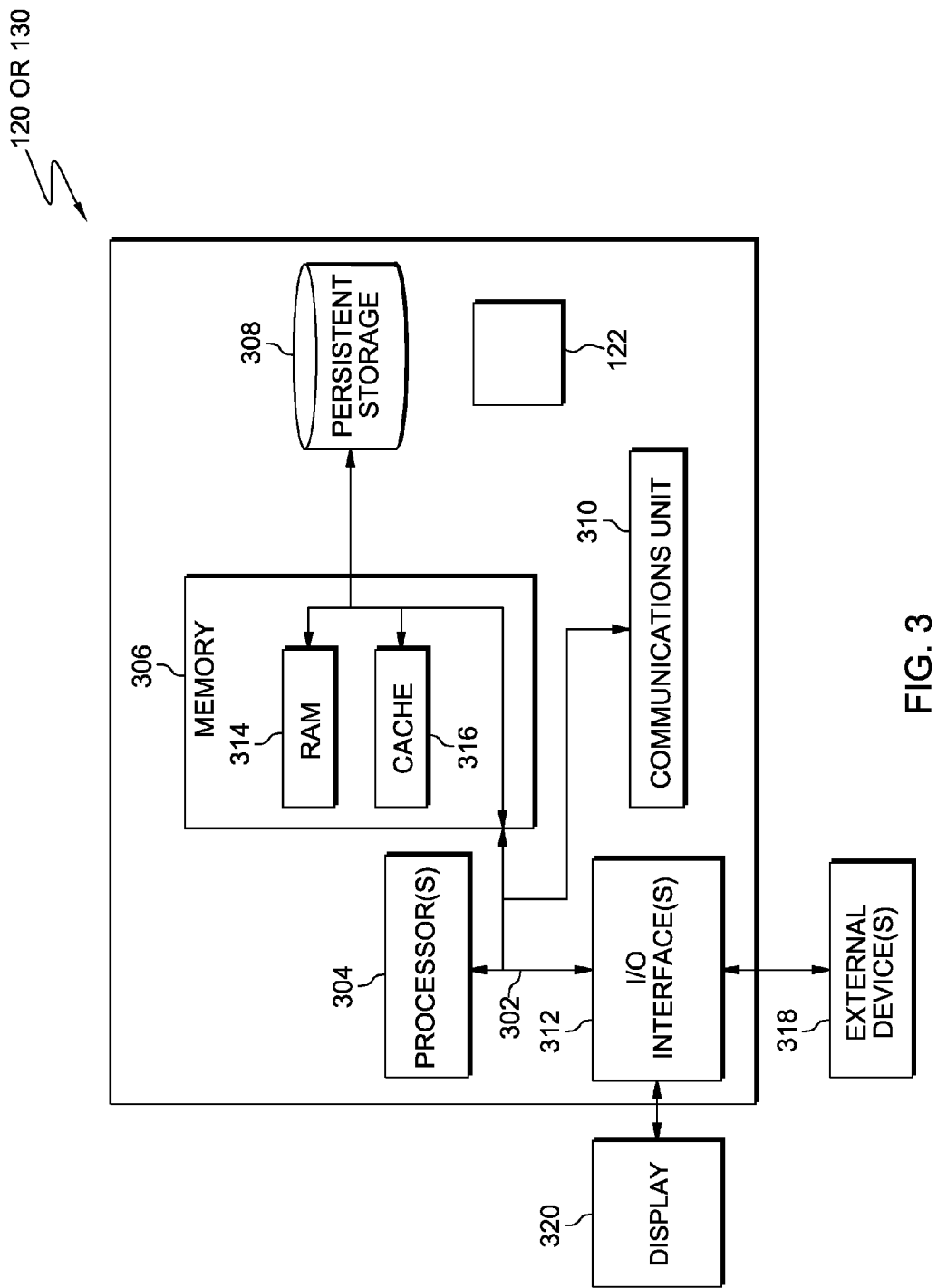
FIG. 3 depicts a block diagram of internal and external components of a data processing system, such as the server computer or the user computing device of FIG. 1, in accordance with an embodiment of the present invention.

FIG. 3 depicts a block diagram of internal and external components of a data processing system, such as server computer 120 or user computing device 130 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 and user computing device 130 include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Activity predicting program 122 and user feature storage 124 on server computer 120 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including between server computer 120 and user computing device 130. In these examples, communications unit 310 includes one or more network interface cards. Communications unit 310 may provide communications through the use of either or both physical and wireless communications links. Activity predicting program 122 and user feature storage 124 on server computer 120 may be downloaded to persistent storage 308 through communications unit 310.

I/O interface(s) 312 allows for input and output of data with other devices that may be connected to server computer 120 or user computing device 130. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., activity predicting program 122 and user feature storage 124 on server computer 120, can be stored on such portable computer-readable storage media and can be loaded onto persistent storage 308 via I/O interface(s) 312. I/O interface(s) 312 also connect to a display 320. Display 320 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for predicting user activity in a social media application, the method comprising the steps of:
    collecting activity information for a user from a social media application;
    determining, by one or more computer processors, activity features of the user, based on the collected activity information for the user;
    creating a model to predict a future activity of the user in the social media application, wherein the model uses the determined activity features of the user;
    determining based on results obtained from running the created model, the future activity of the user in the social media application;
    creating, by one or more computer processors, a plurality of models to predict future activity of the user;
    collecting historical data of the user from the social media application;
    comparing results from running the plurality of models to the historical data;
    determining results from a first model of the plurality of models are more similar to the historical data than results from a second model of the plurality of models; and
    determining whether the first model performs more accurately than the second model, based on the compared results.

2. The method of claim 1, wherein the activity information includes at least one of: historic activity patterns of the user, activity of the user immediately before a current time, historic activity patterns of one or more users connected to the user, and activity of the one or more users connected to the user immediately before the current time.

3. The method of claim 1, wherein the determined activity features include at least one of: a frequency of action, a type of action, a temporal distribution of action, and a content of an action.

4. The method of claim 1, wherein the created model is one or more of: a mathematical model, a machine learning model, or a combination of a mathematical and a machine learning model.

5. The method of claim 1, wherein the future activity of the user is at least one of an activity level of the user or a time before next action by the user, wherein the activity level of the user is a representation of how active the user is and the time before next action by the user is particular to a type of action.

6. The method of claim 1, wherein the step of creating a model further comprises:
    selecting a model type, wherein the model type is one of a mathematical model, a machine learning model, or a combination of a mathematical and a machine learning model; and
    determining settings and parameters for the model type, wherein the settings and parameters are one or more of the determined activity features.

7. A computer program product for predicting user activity in a social media application, the computer program product comprising a computer readable storage medium having program code embodied therewith, wherein the computer readable storage medium is not a transitory signal per se, the program code readable/executable by a computer processor to:
    collect activity information for a user from a social media application;
    determine activity features of the user, based on the collected activity information for the user;
    create a model to predict a future activity of the user in the social media application, wherein the model uses the determined activity features of the user;
    determine, based on results obtained from running the created model, the future activity of the user in the social media application;
    create a plurality of models to predict future activity of the user;
    collect historical data of the user from the social media application;
    compare results from running the plurality of models to the historical data;
    determine results from a first model of the plurality of models are more similar to the historical data than results from a second model of the plurality of models; and
    determine the first model performs more accurately than the second model, based on the compared results.

8. The computer program product of claim 7, wherein the activity information includes at least one of: historic activity patterns of the user, activity of the user immediately before a current time, historic activity patterns of one or more users connected to the user, and activity of the one or more users connected to the user immediately before the current time.

9. The computer program product of claim 7, wherein the determined activity features include at least one of: a frequency of action, a type of action, a temporal distribution of action, and a content of an action.

10. The computer program product of claim 7, wherein the created model is one or more of: a mathematical model, a machine learning model, or a combination of a mathematical and a machine learning model.

11. The computer program product of claim 7, wherein the future activity of the user is at least one of an activity level of the user or a time before next action by the user, wherein the activity level of the user is a representation of how active the user is and the time before next action by the user is particular to a type of action.

12. The computer program product of claim 7, wherein to create a model comprises the program code further being readable/executable by a computer processor to:
- select a model type, wherein the model type is one of a mathematical model, a machine learning model, or a combination of a mathematical and a machine learning model; and
- determine settings and parameters for the model type, wherein the settings and parameters are one or more of the determined activity features.

13. A computer system for predicting user activity in a social media application, the computer system comprising:
- one or more computer processors;
- one or more computer-readable tangible storage media;
- program instructions stored on the one or more computer-readable tangible storage media for execution by at least one of the one or more computer processors, the program instructions:
  - collect activity information for a user from a social media application;
  - determine activity features of the user, based on the collected activity information for the user;
  - create a model to predict a future activity of the user in the social media application, wherein the model uses the determined activity features of the user;
  - determine, based on results obtained from running the created model, the future activity of the user in the social media application;
  - create a plurality of models to predict future activity of the user;
  - collect historical data of the user from the social media application;
  - compare results from running the plurality of models to the historical data;
  - determine results from a first model of the plurality of models are more similar to the historical data than results from a second model of the plurality of models; and
  - determine the first model performs more accurately than the second model, based on the compared results.

14. The computer system of claim 13, wherein the activity information includes at least one of: historic activity patterns of the user, activity of the user immediately before a current time, historic activity patterns of one or more users connected to the user, and activity of the one or more users connected to the user immediately before the current time.

15. The computer system of claim 13, wherein the determined activity features include at least one of: a frequency of action, a type of action, a temporal distribution of action, and a content of an action.

16. The computer system of claim 13, wherein the future activity of the user is at least one of an activity level of the user or a time before next action by the user, wherein the activity level of the user is a representation of how active the user is and the time before next action by the user is particular to a type of action.

17. The computer system of claim 13, wherein the program instructions to create a model:
- select a model type, wherein the model type is one of a mathematical model, a machine learning model, or a combination of a mathematical and a machine learning model; and
- determine settings and parameters for the model type, wherein the settings and parameters are one or more of the determined activity features.

* * * * *